United States Patent
Kim et al.

(10) Patent No.: US 9,929,409 B2
(45) Date of Patent: *Mar. 27, 2018

(54) BATTERY HAVING ELECTRODE STRUCTURE INCLUDING METAL FIBER AND PREPARATION METHOD OF ELECTRODE STRUCTURE

(75) Inventors: Chang Hyeon Kim, Chungcheongnam-do (KR); Lee Hyun Shin, Busan (KR); Chul Hwan Kim, Daejeon (KR)

(73) Assignee: JENAX INC., Busan (KR)

(*) Notice: Subject to any disclaimer, the term of this patent is extended or adjusted under 35 U.S.C. 154(b) by 110 days.

This patent is subject to a terminal disclaimer.

(21) Appl. No.: 14/110,180

(22) PCT Filed: Apr. 4, 2012

(86) PCT No.: PCT/KR2012/002517
§ 371 (c)(1),
(2), (4) Date: Oct. 7, 2013

(87) PCT Pub. No.: WO2012/138115
PCT Pub. Date: Oct. 11, 2012

(65) Prior Publication Data
US 2014/0030605 A1 Jan. 30, 2014

(30) Foreign Application Priority Data
Apr. 6, 2011 (KR) .................. 10-2011-0031917

(51) Int. Cl.
*H01M 4/80* (2006.01)
*H01M 4/62* (2006.01)
(Continued)

(52) U.S. Cl.
CPC .......... *H01M 4/806* (2013.01); *H01M 4/043* (2013.01); *H01M 4/62* (2013.01); *H01M 4/626* (2013.01);
(Continued)

(58) Field of Classification Search
CPC ................................ H01M 10/26; H01M 4/36
See application file for complete search history.

(56) References Cited

U.S. PATENT DOCUMENTS

2002/0168569 A1   11/2002   Barriere et al.
2006/0148112 A1    7/2006   Mitchell et al.
(Continued)

FOREIGN PATENT DOCUMENTS

CN    101098026    1/2008
JP    61-110966    5/1986
(Continued)

OTHER PUBLICATIONS

International Search Report dated Oct. 25, 2012 for PCT/KR2012/002517.
(Continued)

*Primary Examiner* — Barbara L Gilliam
*Assistant Examiner* — Nathanael T Zemui

(57) ABSTRACT

The present invention relates to a battery having an electrode structure using metal fiber and a preparation method of an electrode structure. A preparation method of an electrode structure, according to one embodiment of the present invention, includes a step for providing one or more metal fibers forming a conductive network; a step for providing particle compositions including electrical active materials of a particle shape; a step for mixing the metal fibers and the particle compositions; and a step for compressing the mixed metal fibers and the particle compositions.

16 Claims, 4 Drawing Sheets

(51) Int. Cl.
*H01M 4/04* (2006.01)
*H01M 4/66* (2006.01)
*H01M 10/052* (2010.01)
*H01M 4/02* (2006.01)

(52) U.S. Cl.
CPC .......... *H01M 4/661* (2013.01); *H01M 4/0416* (2013.01); *H01M 4/0419* (2013.01); *H01M 10/052* (2013.01); *H01M 2004/021* (2013.01); *Y10T 29/49108* (2015.01)

(56) References Cited

U.S. PATENT DOCUMENTS

| | | | | |
|---|---|---|---|---|
| 2009/0269677 | A1* | 10/2009 | Hirose | H01M 4/134 429/338 |
| 2009/0305135 | A1* | 12/2009 | Shi | B82Y 30/00 429/217 |
| 2013/0202960 | A1* | 8/2013 | Kim | H01M 4/02 429/209 |

FOREIGN PATENT DOCUMENTS

| | | |
|---|---|---|
| JP | 10-321216 | 12/1998 |
| JP | 2001-085012 | 3/2001 |
| JP | 2002-057313 | 3/2002 |
| JP | 2003-308831 | 10/2003 |
| JP | 2006-120437 | 5/2006 |
| JP | 2006-196404 | 7/2006 |
| JP | 2007-141605 | 6/2007 |
| JP | 2007-335283 | 12/2007 |
| JP | 2009-206079 | 9/2009 |
| JP | 2009-212113 | 9/2009 |
| JP | 2010-097751 | 4/2010 |
| JP | 2011-014409 | 1/2011 |

OTHER PUBLICATIONS

Written Opinion of the International Search Report dated Oct. 25, 2012 for PCT/KR2012/002517.

* cited by examiner

BATTERY HAVING ELECTRODE STRUCTURE INCLUDING METAL FIBER AND PREPARATION METHOD OF ELECTRODE STRUCTURE

This application claims the priority of Korean Patent Application No. 10-2011-0031917, filed on Apr. 6, 2011 in the KIPO (Korean Intellectual Property Office), the disclosure of which is incorporated herein entirely by reference. Further, this application is the National Stage application of International Application No. PCT/KR2012/002517, filed Apr. 4, 2012, which designates the United States and was published in Korean. Each of these applications is hereby incorporated by reference in their entirety into the present application.

TECHNICAL FIELD

The present invention relates to a battery technology, and more particularly, to a battery having an electrode structure with metallic fibers and a method of fabricating the electrode structure.

BACKGROUND ART

As a semiconductor fabricating technology and a communication technology have recently been developed, the mobile electronic device industry has expanded, and demands for environmental preservation and development of alternative energy due to resource depletion have increased, batteries have been actively studied. Batteries are classified into primary batteries that may be used only once for a predetermined period of time and secondary batteries that may be repeatedly used by being recharged. Lithium which is used as a material of a battery has advantages in that it is the lightest metal from among metals known in the nature system, has the lowest standard reduction potential, has high energy density when the battery is manufactured, and has a high voltage. Accordingly, studies of primary batteries and secondary batteries using lithium have been greatly spotlighted.

Lithium primary batteries are often used as main power supply sources of portable electronic devices or backup power supply sources. Devices to which lithium secondary batteries are applied have been diversified from small devices such as mobile phones, notebooks, and mobile displays to medium and large devices for electric vehicles and hybrid vehicles.

Accordingly, batteries are required to have high stability and cost effectiveness as well as lightweight and small design, high energy density, high charge/discharge speed, high charge/discharge efficiency, and excellent cycle characteristics.

DISCLOSURE OF THE INVENTION

Technical Problem

The present invention provides a battery including an electrode structure which has high energy density, charge/discharge speed, high charge/discharge efficiency, and excellent cycle characteristics and whose shape and capacity may be easily adjusted.

The present invention also provides a method of fabricating the battery.

Technical Solution

According to an aspect of the present invention, there is provided a battery including an electrode structure, the battery including: a conductive network that is formed by using one or metal fibers; and a particle composition including electrically active materials that are provided as particles and are bound to the conductive network.

The one or more metal fibers may be bonded to one another by randomly only physically contacting one another, and the conductive network has a nonwoven structure. The particle composition may further include any one or all of a conductor, a binder, and porous ceramic particles. The binder may be provided as a point binder between the one or more metal fibers and the electrically active materials, and between the electrically active materials.

Each of the one or more metal fibers may have a thickness ranging from 1 µm to 200 µm. Each of the one or more metal fibers may have a thickness ranging from 2 µm to 20 µm. The one or more metal fibers may include any one of stainless steel, aluminum, nickel, titanium, copper, an alloy thereof, or a combination thereof. A ratio of an average size of the electrically active materials to an average thickness of the one or more metal fibers may range from 0.01 to 10.

According to another aspect of the present invention, there is provided a method of manufacturing an electrode structure, the method including: providing one or more metal fibers that constitute a conductive network; providing a particle composition that includes electrically active materials which are particles; mixing the one or more metal fibers with the particle composition to obtain a mixture; and compressing the mixture of the one or more metal fibers and the particle composition.

The one or more metal fibers may be provided as a fiber layer having a nonwoven structure by being randomly arranged. The mixing may include disposing the particle composition as non-solvent dry powder on the fiber layer. The mixing may include mixing the one or more metal fibers with the particle composition by spraying the particle composition into the conductive network.

The particle composition may include external additives selected from any one of binder particles, conductor particles, porous ceramic particles which are mixed along with the electrically active materials, and a combination thereof, wherein the external additives are mixed with the electrically active materials by using a dry mixing process.

The providing of the one or more metal fibers may include pre-coating a binder on surfaces of the one or more metal fibers. The particle composition may include external additives selected from any one of conductor particles and porous ceramic particles which are mixed along with the electrically active materials, and a combination thereof, wherein the external additives are mixed with the electrically active materials by using a dry mixing process.

The particle composition may include external additives selected from any one of conductor particles and porous ceramic particles which are mixed along with the electrically active materials, and a combination thereof, and a binder is pre-coated on surfaces of any one or both of the conductor particles and the porous ceramic particles, wherein the external additives are mixed with the electrically active materials by using a dry mixing process.

The method may further include performing heating or emitting ultraviolet rays at the same time as the compressing.

Advantageous Effects

According to the one or more embodiments of the present invention, since metal fibers which have excellent electrical, mechanical, and thermal characteristics which a metal has and flexibility and a structure which a fiber has, a contact resistance between a current collector and electrically active materials may be reduced and a contact area may be increased, thereby improving energy density battery, charge/discharge speed, charge/discharge efficiency, and cycle characteristics of a battery. Also, since a conductive network including the metal fibers may reduce a change in volumes of the electrically active materials during charging/discharging, next-generation high efficiency Li intercalation materials may be used as the electrically active materials. Also, since a current collector using fibers having a nonwoven fabric instead of a current collector using an existing foil is used, the number of separators used to form a battery by stacking electrodes may be reduced. As a result, since an electrode may be manufactured to have a great thickness in the same battery volume, the battery may have high energy density per unit volume.

Also, since a method of manufacturing an electrode structure does not use a solvent such as water or an organic solvent in a process of forming a particle composition and a mixing process except in a process of pre-coating a binder, an environmental load may be reduced. Also, after the particle composition is infiltrated into a conductive network, since an additional dry process for removing the solvent in a slurry is not required, a process may be facilitated, productivity may be improved, and equipment may be simplified. When the solvent for the binder applied to the slurry remains on electrically active materials, the electrically active materials may be deteriorated. Accordingly, the mixing process using non-solvent dry powder may improve yield.

MODE FOR CARRYING OUT THE INVENTION

Figure 1A:
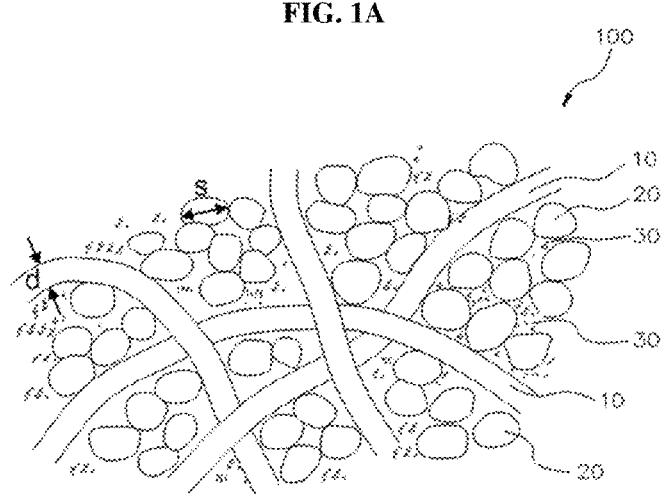
FIGS. 1A to 1C are views illustrating electrode structures according to embodiments of the present invention.

The present invention will now be described more fully with reference to the accompanying drawings, in which exemplary embodiments of the invention are shown.

The present invention now will be described more fully hereinafter with reference to the accompanying drawings, in which elements of the invention are shown. The present invention may, however, be embodied in many different forms and should not be construed as limited to the exemplary embodiments set forth herein. Rather, these embodiments are provided so that this disclosure will be thorough and complete, and will fully convey the scope of the present invention to one of ordinary skill in the art.

Also, in the drawings, thicknesses or sizes of layers are exaggerated for convenience of explanation and clarity, and the same reference numerals denote the same elements. As used herein, the term "and/or" includes any and all combinations of one or more of the associated listed items.

The terminology used herein is for the purpose of describing particular embodiments only and is not intended to be limiting of exemplary embodiments of the present invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of exemplary embodiments.

A long metal fiber used herein which is obtained by fiberizing a metal such as stainless steel, aluminum, nickel, titanium, copper, or an alloy thereof refers to a metal thread having a diameter ranging from several micrometers ($\mu$m) to tens of $\mu$m and a length equal to or greater than tens of $\mu$m. The long metal fiber has heat resistance, plasticity, and electrical conductivity like a metal, and also may be woven or nonwoven like a fiber. The present invention relates to an electrode structure of a battery using the advantages of the long metal fiber.

Such long metal fibers may be manufactured by maintaining a molten metal or alloy in a container and rapidly solidifying the molten metal or alloy by spraying the molten metal or alloy into the air through discharge holes in the container by using a pressure means such as a piston or a compressed gas. Alternatively, the long metal fibers may be manufactured by using a well-known bundle drawing method. Thicknesses, uniformity, a structure such as a nonwoven structure, and an aspect ratio of the long metal fibers may be controlled by controlling the number of the discharge holes, sizes of the discharge holes, and/or the flight of the molten metal. The long metal fibers constituting the battery may be manufactured as described above or may be manufactured by using any of other well-known methods without departing from the scope of the present invention.

When the term 'separator' is used herein, the separator includes a separator that is generally used in a liquid electrolyte battery using a liquid electrolyte having low affinity with the separator. Furthermore, when the separator used herein includes an intrinsic solid polymer electrolyte and/or a gel solid polymer electrolyte which is so strongly bound to the separator that the electrolyte and the separator are recognized as the same. Accordingly, the meaning of the separator has to be defined as described herein.

Figure 1B:
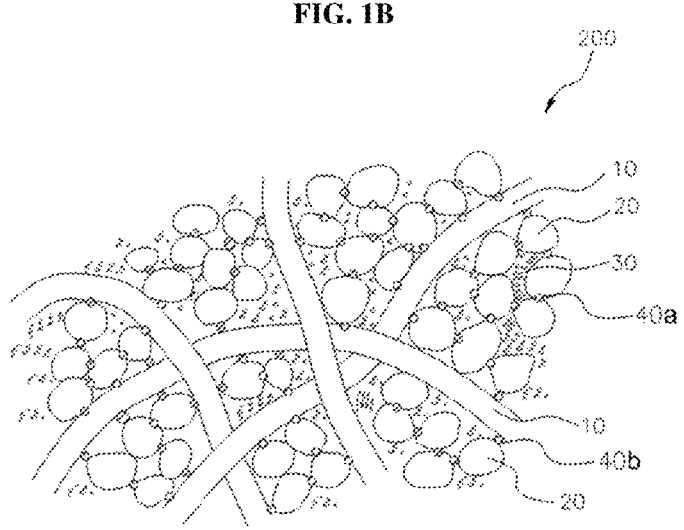
Figure 1C:
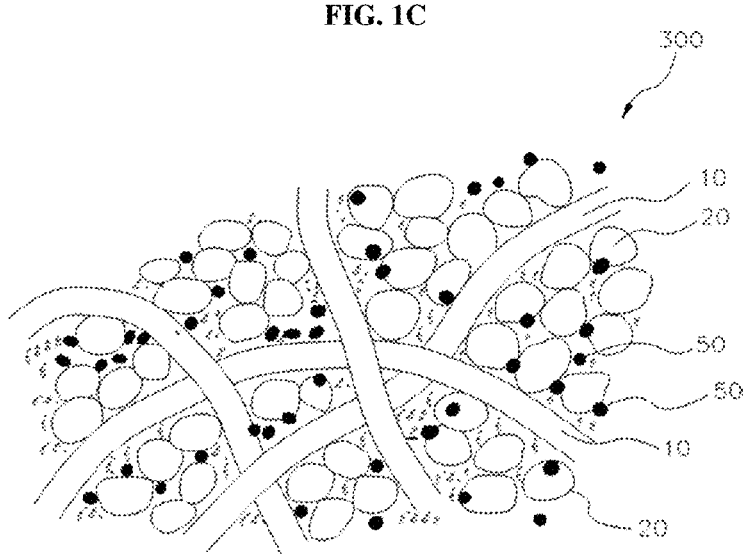

FIGS. 1A to 1C are views illustrating electrode structures 100, 200, and 300 according to embodiments of the present invention.

Referring to FIGS. 1A to 1C, each of the electrode structures 100, 200, and 300 includes one or more metal fibers 10 and electrically active materials 20. The metal fibers 10 may have plasticity due to ductility and malleability of a metal. Also, a plurality of the metal fibers 10 each having an appropriate length may be provided by being segmented. The number of the metal fibers 10 may be appropriately determined according to a size and a capacity of a battery.

Each of the metal fibers 10 may have a thickness ranging from 1 μm to 200 μm. When a thickness of each of the metal fibers 10 is equal to or less than 1 μm, it may be difficult to shape the metal fibers 10 to have uniform properties, and may be difficult to arbitrarily arrange the metal fibers 10 to form a conductive network as will be described below. Also, when a thickness of each of the metal fibers 10 is equal to or greater than 200 μm, since a surface area per volume of the metal fibers 10 is reduced, it may be difficult to improve the performance of the battery by increasing surface area. Since a binding force of the electrically active materials 20 is reduced, the electrically active materials 20 may be separated from each of the electrode structures 100, 200, and 300 during use, thereby reducing a capacity of the battery. Preferably, each of the metal fibers 10 may have a thickness ranging from 2 μm to 20 μm. In this case, a ratio of a surface area to a volume per unit length (for example, 4/diameter when the battery has a circular cross-sectional shape) may be $4 \times 10^5$ (1/m) to $2 \times 10^6$ (1/m).

In general, a conventional current collector using a foil has a thickness of about 20 μm. When the metal fibers 10 each having a thickness ranging from 2 μm to 20 μm instead of the conventional current collector using a foil having a thickness of 20 μm is used, a surface area may be increased by about 4 times to 40 times. Accordingly, a surface area when a current collector having metal fibers is used may be greater than a surface area when a conventional collector having a foil is used, assuming that the conventional collect and the current collect have the same weight. As such, according to the present embodiment, a surface area of a current collector may be easily adjusted by adjusting a thickness of each of the metal fibers 10. A surface area of a current collector refers to a surface area of a conductive network per volume of the metal fibers 10 that form reaction interfaces with each of the electrically active materials 20 and an electrolytic solution 30. The battery having very high energy density may be formed by maximizing the surface area.

In some embodiments, an average length of the metal fibers 10 may range from 5 mm to 1000 mm. In this case, an average aspect ratio of the metal fibers 10 may range from 25 to $10^6$. If necessary, the metal fibers 10 are used for each of the electrode structures 100, 200, and 300 by being segmented to have a length ranging from about 5 cm to about 8 cm. In reality, it is difficult to obtain fibers having flexibility and excellent conductivity and having an aspect ratio equal to or greater than 103 from a material other than a metal material. For example, there may be attempts to obtain fibers having conductivity by fiberizing process using a conductive polymer material. Since the conductive polymer material obtained in these attempts has higher resistance than metal fibers, however, it is difficult to improve electrical conductivity of electrically active materials and mechanical and thermal stability of a battery may be deteriorated during use.

As to the thermal characteristics, the electrically active materials 20 bound to the conductive network may be sintered by using thermal treatment. In this case, the electrically active materials 20 may be further strongly bonded to the metal fibers 10. It is impossible to perform such a sintering process on a conventional electrode structure using conductive polymer fibers.

Alternatively, in the conductive network including the metal fibers 10, the metal fibers 10 may physically contact one another without being chemically bonded to one another through sintering. The present inventors have found that the conductive network in which the metal fibers 10 physically contact one another without being chemically bonded to one another suffers less performance degradation during often charging/discharging. This is because when the metal fibers 10 simply physically contact one another without being chemically bonded to one another, the conductive network may more flexibly respond to a volume change during charging/discharging.

Although the metal fibers 10 illustrated in FIGS. 1A to 1C have substantially linear and curved shapes, the present embodiment is not limited thereto. The metal fibers 10 may have other regular or irregular shapes such as curled shapes or spiral shapes. The metal fibers 10 having linear shapes, curved shapes, or other regular/irregular shapes are electrically connected to one another in each of the electrode structures 100, 200, and 300 by physical contacting or being chemically bonded to one another to form one conductive network. Since the conductive network is formed such that the metal fibers 10 are curved, bent, tangled, contact, or bonded to one another, pores may be formed therein, high mechanical strength may be ensured, and flexibility due to fiber characteristics may be obtained.

The metal fibers 10 may include any one of stainless steel, aluminum, nickel, titanium, copper, an alloy thereof, or a combination thereof. For example, in the case of a cathode, the metal fibers 10 may include aluminum or an alloy thereof which is not oxidized in a high potential area. In the case of an anode, the metal thin films 10 may include copper, stainless steel, nickel, or an alloy thereof which is electrochemically inactive at a low operational potential.

The metals are exemplary, and other appropriate metal materials which are stable and are not oxidized and reduced for each electrode may be used. Also, if necessary, the metal fibers 10 may include two or more different types of metals, and may be chemically bonded to one another by forming an intermetallic compound therebetween by using an additional process such as thermal treatment or sintering.

The electrically active materials 20 are bound in the conductive network including the metal fibers 10. In order for the electrically active materials 20 to be strongly bound to the conductive network, sizes of pores in the conductive network including the metal fibers 10 and porosity may be appropriately adjusted. The sizes of the pores and the porosity may be adjusted by adjusting a mixture ratio by weight between the electrically active materials 20 and the metal fibers 10 in the electrode structure 100.

In some embodiments, the mixture ratio by weight of the metal fibers 10 in the electrode structure 100 may be adjusted by increasing the number or length of the metal fibers 10. Alternatively, the sizes of the pores and the porosity in the electrode structure 100 may be appropriately adjusted by mechanically compressing a mixture of the metal fibers 10 and the electrically active materials 20 by using a pressure device such as a roll press. Due to the compression, the conductive network having a nonwoven structure may be mechanically further strengthened, and the electrically active materials 20 are strongly bound to the conductive network, thereby improving energy density of a battery.

The electrically active materials 20 may be particles having an average size ranging from 0.1 μm to 100 μm. The electrically active materials 20 may have a particle-size distribution of a predetermined range, and if necessary, the particle-size distribution of the electrically active materials 20 may be controlled by using a classification process. In some embodiments, the electrically active materials 20 may have an average size ranging from 0.1 μm to 15 μm. As described above, assuming that the conductive network includes the metal fibers 10 each having a thickness ranging from 1 μm to 200 μm, it is desirable that a size s of each of the electrically active materials 20 which are bound to the conductive network corresponds to a thickness d of each of the metal fibers 10. In this case, the electrically active materials 20 may be well bound in the conductive network. In some embodiments, a ratio s/d of the average size s of each of the electrically active materials 20 which are particles to the thickness d of each of the metal fibers 10 may range from 0.1 to 10. When the ratio s/d is less than 0.01, the electrically active materials 20 may drop into the electrolytic solution 30, and when the ratio s/d is equal to or greater than 10, a reduction in a volume change and improvement in electrical conductivity due to the conductive network may be reduced.

Since the electrically active materials 20 are provided as particles by being segmented, battery deterioration due to a change in a stress applied to electrically active materials 20 during an oxidation/reduction cycle, especially, the electrically active materials 20 for an anode, may be suppressed or reduced. Also, since the metal fibers 20 pass through between the electrically active materials 20 which are provided as particles, each of the electrode structures 100, 200, and 300 may absorb a mechanical stress due to oxidation/reduction, reduce irreversibility between charge and discharge due to the mechanical stress, and may suppress a reduction in a capacity as the battery is used. Also, since heat generated during charging/discharging is well distributed, even when the number of times charging/discharging occurs is increased, a reduction in a capacity due to deterioration may be suppressed.

In detail, when the battery is a Li ion battery which is a representative secondary battery, a volume of the electrically active materials 20 for a high-capacity anode may be increased 100% or more during lithiation. In this case, during an electrochemical charge/discharge cycle, an anode is repeatedly expanded and contracted, and thus may be cracked. In a conventional structure in which the electrically active materials 20 are coated on a current collector, due to the cracks, when the electrically active materials 20 no longer electrically contact the current collector, electrical conductivity between the electrically active materials 20 may be reduced, a capacity may be drastically reduced, irreversibility may be increased, and the risk of instability may be increased.

However, in each of the electrode structures 100, 200, and 300, the conductive network may function as a current collector. Also, since the pores formed by the metal fibers 10 and the electrically active materials 20 reduce a change in volumes of the electrically active materials 20 during charging/discharging, cracks may not occur in the electrically active materials 20. Since the electrically active materials 20 which are particles are still bonded to the metal fibers 10, a reduction in electrical conductivity which may occur when the electrically active materials 20 are separated from one another may be prevented, thereby improving reversibility between charge/discharge.

In order to address cracks in an electrode due to a change in a volume of an anode during charging/discharging, a nanoscale electrode structure which is less vulnerable to a change in volume or cracks, for example, nanowires, nanotubes, or nanorods, have recently been suggested. However, the nanoscale electrode structure may be for a small battery and may not be applied to a high-capacity large battery, and requires a complex fabricating process such as catalytic reaction. Also, in order to coat electrically active materials on the nanoscale electrode structure, a complex process such as vacuum deposition needs to be performed. However, according to the present embodiment, since a size and a shape of the electrode structure may be more easily changed than the conventional nanoscale electrode structure, the battery may be used as a small battery or a medium or large battery having high capacity. Also, the battery having any of various shapes and functions may be manufactured at low costs by using a stacking or mixing process as will be described below.

The electrically active materials 20 which are particles and bound in the conductive network may be appropriately determined according to a polarity of the electrode structure and whether the battery is a primary battery or a secondary battery. For example, the electrically active materials 20 for a cathode may be selected from the group consisting of oxide, phosphate, sulfide, fluoride, each of which includes two or more components selected from lithium, nickel, cobalt, chromium, magnesium, strontium, vanadium, lanthanum, cerium, iron, cadmium, lead, titanium, molybdenum, and/or manganese, and a combination thereof. However, the present embodiment is not limited thereto, and the electrically active materials 20 for a cathode may be formed of another chalcogen compound. Preferably, the electrically active materials 20 for a cathode may be a lithium compound including three or more components, that is, a lithium compound including at least two of cobalt, copper, nickel, manganese, titanium, and molybdenum which are suitable for a lithium secondary battery and including at least one nonmetal element selected from the group consisting of oxygen (O), fluorine (F), sulfur (S), phosphorus (P), and a combination thereof.

The electrically active materials 20 for an anode may be a carbon-based material, for example, a low-crystallized carbon-based material or a high-crystallized carbon-based material. The low-crystallized carbon may be, for example, soft carbon or hard carbon. The high-crystallized carbon may be high temperature baked carbon such as natural graphite, Kish graphite, pyrolytic carbon, mesophase pitch-based carbon fiber, meso-carbon microbeads, mesophase pitches, or petroleum or coal tar pitch-derived cokes. The materials are exemplary, and other carbon-based materials such as diamond-based materials and carbyne-based materials may also be used.

In other embodiments, the electrically active materials 20 for an anode may include at least one of sodium or another oxide, carbide, nitride, sulfide, phosphide, selenium, and tellurium which are suitable for a NaS battery, instead or along with the above carbon-based materials. Alternatively, the electrically active materials 20 for an anode may include a single atom-based material such as silicon, geranium, tin, lead, antimony, bismuth, zinc, aluminum, iron, or cadmium which may absorb and emit high-capacity lithium ions for a high-capacity cathode, an intermetallic compound thereof, or a non-carbon-based active material such as an oxide-based material.

In other embodiments, since the conductive network provides buffering action to a change in a volume of the electrically active materials 20, the electrically active materials 20 may include a metal-based compound or an intermetallic compound whose capacity is high and whose volume change is large such as silicon (Si), bismuth (Bi), tin (Sn), aluminum (Al), or an alloy thereof which is considered as a next-generation high efficiency Li intercalation material.

In some embodiments, as shown in the electrode structure 200 of FIG. 1B, a binder 40 may be added such that the electrically active materials 20 which are particles may be strongly bound to the conductive network. The binder may be a polymer-based material such as vinylidene fluoride-hexfluoropropylene copolymer (PVDF-co-HFP), polyvinylidenefluoride (PVDF), polyacrylonitrile, polymethylmethacrylate, polytetrafluoroethylene (PTFE), styrenebutadiene rubber (SBR), polyimide, polyurethane-based polymer, polyester-based polymer, or ethylene-propylene-diene copolymer (EPDM). If necessary, the binder may be, but is not limited to, another polymer-based material having conductivity such as petroleum pitch or coal tar. The present embodiment is not limited to the materials, and the binder may be formed of any material that has stability and a predetermined binding force under an electrochemical environment and may not be dissolved in an electrolyte.

Binders 40a and 40b may be added such that a weight of the binders 40a and 40b is about 0.5 to 5% with respect to a total weight of a mixture of the electrically active materials 20 and the binders 40a and 40b. Since the binders 40a and 40b use an organic solvent or water as a dispersion medium in a general fabricating process, it takes a time to dry the dispersion medium and battery cycle characteristics may be degraded because the dispersion medium remains even after the drying. Also, since the binders 40a and 40b are nonconductors, it is preferable to restrain the use of the binders 40a and 40b. Since the electrically active materials 20 which are particles are strongly bound in the conductive network in the electrode structure 200, the use of the binder 40 may be minimized. Also, when the binders 40a and 40b are used, due to a mechanical fixing force of the conductive network, the use of the binders 40a and 40b may be minimized.

When the use of the binders 40a and 40b is restrained, the binder 40 may exist as a point binder between the electrically active materials 20 which are particles, and between the electrically active materials 20 and the metal fibers 10. The point binder may minimize an increase in internal resistance of the electrode structure 200. A method of fabricating various electrode structures for inducing the point binder will be described below.

When the electrically active materials 20 are electrically active materials for a cathode, a conductor 50 may be further added along with the electrically active materials 20 and the binders 40a and 40b to the electrode structure 300 as shown in FIG. 1C. The conductor 50 may be uniformly mixed with the electrically active materials 20 and may be provided into the electrode structure 300. The conductor 50 may be added such that a weight of the conductor 50 ranges from about 1% to about 15% with respect to a total weight of a mixture of the electrically active materials 20 and the conductor 50.

The conductor 50 may be a nanostructure having a high specific surface area and low resistance such as, a nano metal particle paste, an indium tin oxide (ITO) paste, carbon nanotubes, or fine carbon such as carbon black, acetylene black, ketjen black, or ultrafine graphite particles. Since the metal fibers 10 having a micro size corresponding to the active materials 20 may function as the conductor 50 in the electrode structure 300, an increase in fabricating costs due to the addition of the conductor 50 may be prevented.

Figure 2:
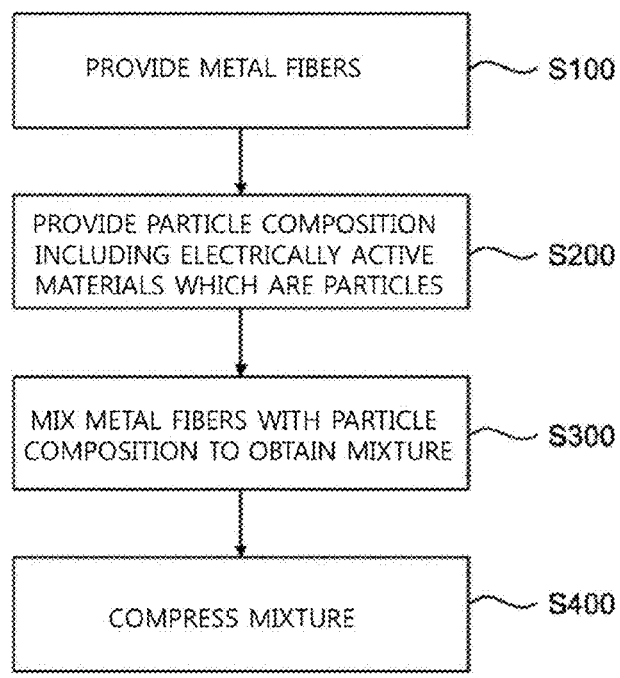
FIG. 2 is a flowchart illustrating a method of fabricating any of the electrode structures of FIGS. 1A to 1C, according to an embodiment of the present invention.

In other embodiments, although not shown in FIGS. 1 to 3, porous ceramic particles may be further added into the electrode structure 100, 200, or 300. The porous ceramic particles may include, for example, porous silica. The porous ceramic particles help the electrolytic solution 30 to be impregnated into each of the electrode structures 100, 200, and 300.

As described above, since the metal fibers 10 have shapability which a fiber has and a mechanical strength, high conductivity, and thermal stability which a metal has, an electrode structure including the metal fibers 10 may improve capacity, energy density, and charge/discharge efficiency. It would be understood by one of ordinary skill in the art that the present invention may be more efficiently applied to a battery which requires high capacity and high charge/discharge speed such as a battery for starting, lighting, and igniting (SLI) a vehicle, a battery for driving an electric vehicle and a hybrid vehicle, or a fixed battery for storing green energy.

Also, due to characteristics of a fiber, that is, flexibility, of each of the electrode structures 100, 200, and 300, the battery using the electrode structure may be flexible. For example, the battery including the electrode structure may be integrated with a flexible product such as clothes or bags. Alternatively, since the battery including the electrode structure may be disposed on a rear surface of a flexible display substrate, the degree of freedom of a place and a space where the battery is disposed may be increased.

FIG. 2 is a flowchart illustrating a method of fabricating any of the electrode structures 100, 200, and 300 of FIGS. 1A to 1C, according to an embodiment of the present invention. FIGS. 3A to 3D are views sequentially illustrating resultant structures of the method of FIG. 2.

Figure 3A:
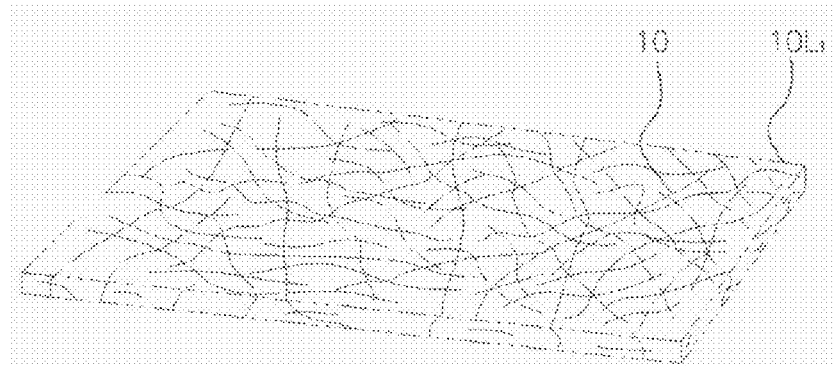
FIGS. 3A to 3D are views sequentially illustrating resultant structures of the method of FIG. 2.

Referring to FIG. 2, in operation S100, the metal fibers 10 are prepared. A plurality of the metal fibers 10 each having a predetermined length may be provided by being segmented. In order to form an electrode structure having a nonwoven structure, the metal fibers 10 may be segmented to have a length ranging from about 5 cm to about 8 cm. As shown in FIG. 3A, the metal fibers 10 may be randomly arranged on an appropriate support plane. In this case, the metal fibers 10 may be stacked to a thickness of a single layer or several to hundreds of layers, thereby providing a first fiber layer 10L1.

In some embodiments, the metal fibers 10 may be deformed by tapping the meal fibers 10 with a bar, and due to the deformation, the metal fibers 10 may be tangled with one another to form a nonwoven structure. The metal fibers 10 in the first fiber layer 10L1 physically contact one another to form a conductive network which is somewhat sparse. Selectively, through appropriate thermal treatment, the metal fibers 10 may be chemically bonded to one another. In this case, the thermal treatment may be performed at a temperature ranging from, for example, 100° C. to 1200° C.

In some embodiments, electrically active materials may be uniformly pre-coated on the metal fibers 10 by using a binder. To this end, the metal fibers 10 on which the electrically active materials are pre-coated may be obtained by dispersing a mixed composition of electrically active material particles and a binder in an appropriate solvent to obtain a resultant structure, dipping the metal fibers 10 in the resultant structure, removing the solvent by using a dry process. The electrically active materials to be pre-coated may be the same as the electrically active materials 20 to be infiltrated in the conductive network or a different type of active materials having chemical affinity with the electrically active materials 20. Alternatively, in order to prevent corrosion of the metal fibers 10 due to an electrolytic solution, the electrically active materials to be pre-coated may include another metal or metal oxide coated body having corrosion resistance.

Next, in operation S200, a particle composition including the electrically active materials 20 to be subjected to battery reaction is prepared. The electrically active materials 20 may be particles each having a size ranging from 0.1 µm to 100 µm as described above. The particle composition may include an external additive selected from any one of a binder, a conductor, and porous ceramic particles or a combination thereof, in addition to the electrically active materials 20.

When at least one of a binder, a conductor, and porous ceramic particles is further included as an additive in the particle composition, the particle composition may be provided by using a dry mixing process. For example, an intermediate mixed particle composition is formed by rotating the electrically active materials 20 which are particles and a predetermined quantity of conductor particles at a high speed by using mixer. Next, solid binder particles are added to the dried intermediate mixed composition and are rotated at a high speed by using the mixer, thereby completing the particle composition. The intermediate mixed particle composition and the particle composition obtained by using the mixing process are non-solvent dry powder which is mixed without using a solvent.

Alternatively, an intermediate mixed particle composition may be formed by introducing binder particles into a mixer along with electrically active materials 20, and rotating the same at a high speed. Next, a conductor may be added to the intermediate mixed particle composition and mixed again, thereby completing the particle composition. Alternatively, the particle composition may be formed by simultaneously adding binder particles and conductor particles to the electrically active materials 20, and rotating the same at a high speed by using a mixer. Even in this case, the intermediate mixed particle composition and the particle composition are non-solvent dry powder.

When the porous ceramic particles are added to the particle composition, the porous ceramic particles may be mixed with other materials, that is, any one of binder particles and a conductor, or electrically active material particles. For example, an intermediate mixed particle composition may be formed by mixing the electrically active material particles, the binder particles, and conductor particles to obtain a resultant structure, and a particle composition may be formed by adding the porous ceramic particles to the resultant structure and mixing the same. Even in this case, the particle composition is non-solvent dry powder.

In the above embodiments, a binder is provided as particles. However, in other embodiments, selectively, the binder may be provided by being pre-coated on surfaces of any one of metal fibers, conductor particles, and porous ceramic particles. To this end, metal fibers on which a binder is pre-coated may be obtained by dipping the metal fibers in a solution in which the binder is dissolved or dispersed, taking out the metal fibers after a predetermined period of time, drying the solvent by using a drier or the like. Alternatively, metal fibers on which a binder is pre-coated may be obtained by dipping the metal fibers in a solvent in which the binder is dissolved or dispersed, and stirring the solution to dry the solvent.

Likewise, conductor particles and/or porous ceramic particles on surfaces of which a binder is pre-coated may be obtained by putting any one or all of the conductor particles and the porous ceramic particles in a solvent in which the binder is dissolved or dispersed, and stirring the solution to dry the solvent. In the above embodiments, since the binder is used by being pre-coated, an environmental load may be lower than that in a conventional fabricating process which forms a slurry by mixing a large quantity of active materials and a binder in a solvent.

As described above, when a binder is pre-coated on surfaces of metal fibers, conductor particles, or porous ceramic particles, a process of adding binder particles when a particle composition is formed may be omitted. As such, when a binder is provided by being pre-coated on metal fibers or additives such as conductor particles or porous ceramic particles, a distribution and a content of the binder in an overall electrode composition may be reasonably controlled. Although attempts to pre-coat a binder on electrically active material particles may be made, a point binder may not be induced when heating is performed at a temperature at which the binder is melted in a compression process, and a battery's electrical characteristics may be deteriorated due to an increase in the amount of the binder added. Accordingly, a binder may be pre-coated only on surfaces of metal fibers, conductor particles, or porous ceramic particles, and may not be pre-coated on electrically active material particles.

As will be described below, since a process of forming an electrode is performed at a relatively low temperature at which a binder may be melted, for example, at a temperature ranging from 50° C. to 400° C., and preferably, at a temperature ranging from 150° C. to 300° C., the binder may be maintained at its pre-coated position, and the binders 40a and 40b which are point binders may be induced between the metal fibers 10 and the electrically active materials 20 and between the electrically active materials 20 and the conductors 50, and further between the electrically active materials 20 as shown in FIG. 1B by being expanded and contracted due to some heat supplied while the electrode is fabricated. Since the binder does not contribute to electrical characteristics except that it has lithium ion conductivity, it is preferable that the use of the binder in the electrode structure is minimized as described above.

Figure 3B:
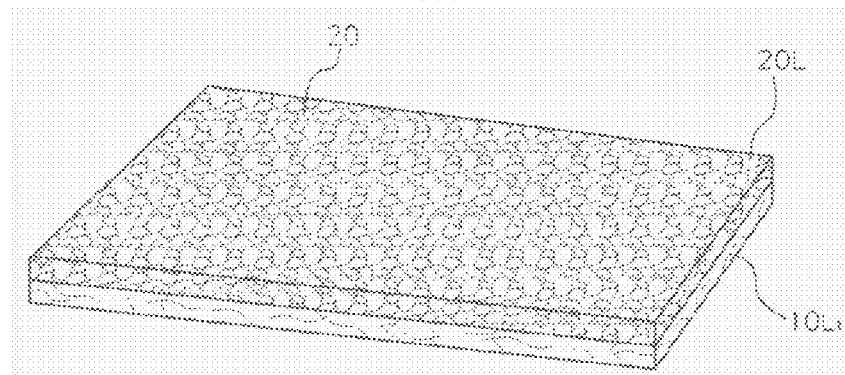

After the particle composition is formed in operation S200, the method proceeds to operation S300. In operation 300, the metal fibers 10 and the particle composition are mixed. When the metal fibers 10 are provided as the first fiber layer $10L_1$, preferably, as a layer having a metal nonwoven structure, as shown in FIG. 3B, the particle composition may be sprayed onto the first fiber layer $10L_1$ such that the metal fibers 10 and the particle composition are mixed with each other. Referring to FIG. 3B, a particle composition 20L is infiltrated into the first fiber layer $10L_1$ and part of the particle composition remains on the first fiber layer $10L_1$. The resultant structure of FIG. 3B is exemplary, and the present embodiment is not limited thereto. For example, an appropriate amount of particle composition may be mixed such that the particle composition may be completely infiltrated into the first fiber layer $10L_1$.

In some embodiments, uniformity of the particle composition infiltrated into the first fiber layer $10L_1$ may be improved by spraying the particle composition onto a top surface of the first fiber layer $10L_1$, turning over a resultant structure, and also spraying the particle composition onto a bottom surface of the first fiber layer $10L_1$ which is exposed. If necessary, during operation S300, in order to promote to uniformly infiltrate the particle composition into pores between the metal fibers 10, an oscillation may be applied at an appropriate frequency with an appropriate strength.

Figure 3C:
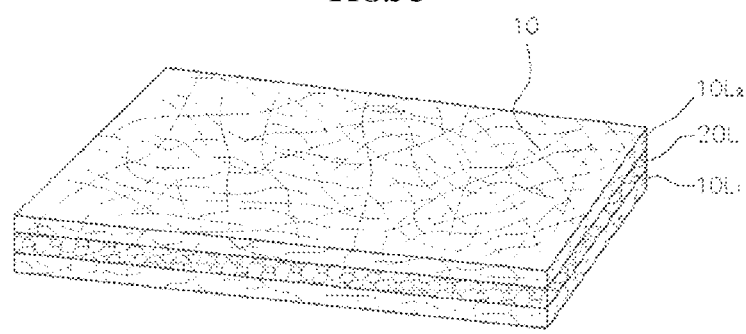

In some embodiments, a second fiber layer $10L_2$ may be further disposed on the resultant structure as shown in FIG. 3C. The second fiber layer $10L_2$ may be formed in a similar manner to that used to form the first fiber layer $10L_1$. The second fiber layer $10L_2$ may have a thickness of a single layer or several to hundreds of layers. The metal fibers 10 may be deformed by patting the metal fibers 10 by using a bar, and thus the metal fibers 10 may be tangled with one another to form a nonwoven structure.

Figure 3D:
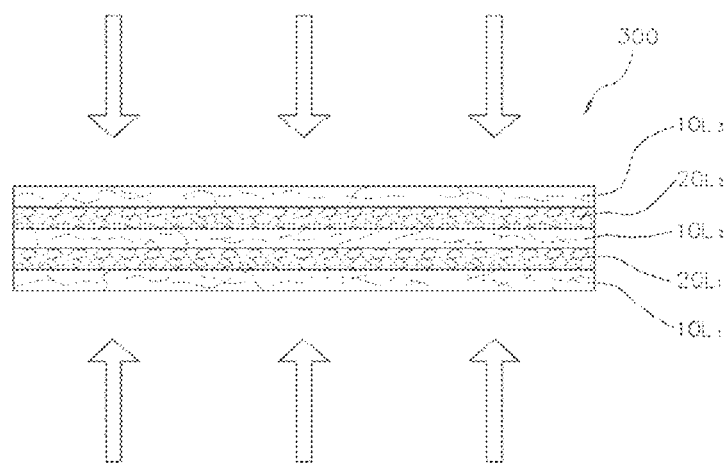

In some embodiments, the operations described with reference to FIGS. 3A to 3C may be repeatedly performed. For example, as shown in FIG. 3D, a process of forming a plurality of fiber layers $10L_1$, $10L_2$, and $10L_3$ and a process of forming electrically active material layers $20L_1$ and $20L_2$ by mixing the fiber layers $10L_1$, $10L_2$, and $10L_3$ with the electrically active materials 20 may be alternately performed several times. Although three fiber layers $10L_1$, $10L_2$, and $10L_3$ and two electrically active material layers $20L_1$ and $20L_2$ are alternately stacked in FIG. 3D, the present embodiment is not limited thereto. For example, two fiber layers $10L_1$ and $10L_2$ and one electrically active material layer 20L may be alternately stacked as shown in FIG. 3C, or four or more fiber layers and three or more electrically active material layers may be alternately stacked.

Referring back to FIG. 3D, when operation S300 ends, the method proceeds to operation S400. In operation S400, a structure 400 obtained by mixing the metal fibers 10 and the particle composition is compressed. Due to operation S400, the structure 400 may have a planar shape having a predetermined thickness. Operation S400 may be performed by using a roll press, and may improve capacity density of the electrode and adhesion between the conductive network and the electrically active materials 20.

If necessary, for example, when binder particles or a pre-coated binder is included in the resultant structure, during operation S400, energy for melting the binder may be applied to the resultant structure. The energy may be heat and/or ultraviolet rays. The energy may be appropriately determined according to a type of the binder, and generally heating may be performed at a relatively low temperature, for example, a temperature ranging from 50° C. to 400° C., and preferably, from 150° C. to 300° C.

In operation S400, a surface of the structure 400 may be compressed in directions marked by arrows. Accordingly, the metal fibers 10 in adjacent fiber layers, for example, in the first fiber layer $10L_1$ and the second fiber layer $10L_2$, and in the second fiber layer $10L_2$ and the third fiber layer $10L_3$ may be tangled with each other to physically contact each other, thereby forming a conductive network over the entire structure 400.

Unlike a conventional method of fabricating an electrode using a metal foil, the method of fabricating the electrode structure described with reference to FIGS. 2 to 3D provides a particle composition as non-solvent dry powder, instead of a slurry. That is, in the above embodiments, the electrically active materials 20 are infiltrated as dry particles without a solvent into the conductive network of the metal fibers 10.

Accordingly, according to the embodiments of the present invention, since a solvent such as water or an organic solvent is not used except in a process of pre-coating a binder, an environmental load may be reduced. Also, after a particle composition is infiltrated into a conductive network, since a dry process of removing a slurry in the solvent is not required, a process may be facilitated, productivity may be improved, and equipment may be simplified. Also, when a solvent for a binder used in a slurry remains on the electrically active materials 20, the electrically active materials 20 may be deteriorated. Accordingly, a mixing process using non-solvent dry powder may improve yield.

Figure 4A:
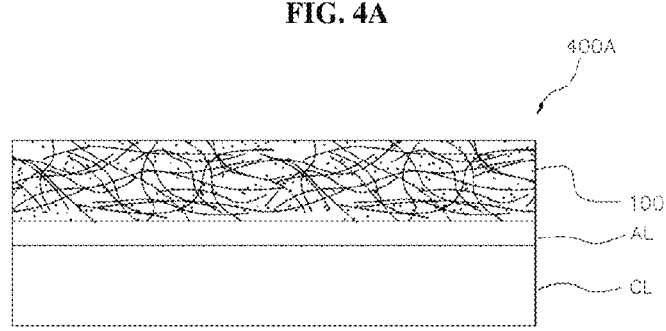
FIGS. 4A and 4B are cross-sectional views illustrating electrode structures according to other embodiments of the present invention.
Figure 4B:
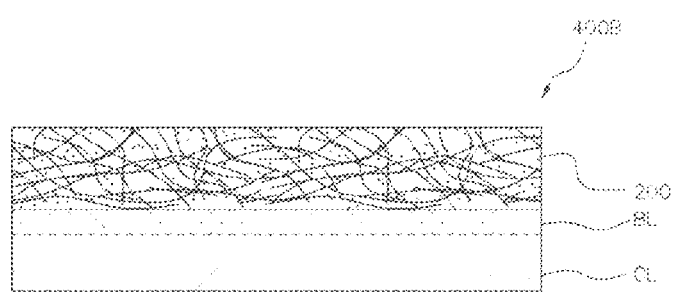

FIGS. 4A and 4B are cross-sectional views illustrating electrode structures 400A and 400B according to other embodiments of the present invention.

Referring to FIGS. 4A and 4B, conductive layers CL may be disposed on surfaces of the electrode structures 100 and 200 having nonwoven structures obtained by using the afore-described method. Since the metal fibers 10 in the electrode structures 100 and 200 having the nonwoven structures function as current collectors, the conductive layers CL may be applied to a tap for assembling the battery.

The conductive layer CL may be attached to the electrode structure 100 having the nonwoven structure by using a conductive adhesive layer AL, for example, a metal paste, as shown in FIG. 4A. Alternatively, the conductive layer CL, as shown in FIG. 4B, may be bonded to the electrode structure 200 by using a bonding layer BL or a reaction layer through chemical bonding between the electrode structure 200 having the nonwoven structure and the conductive layer CL. The conductive layer CL may be a thin metal foil such as stainless steel, aluminum, or copper.

Figure 5A:
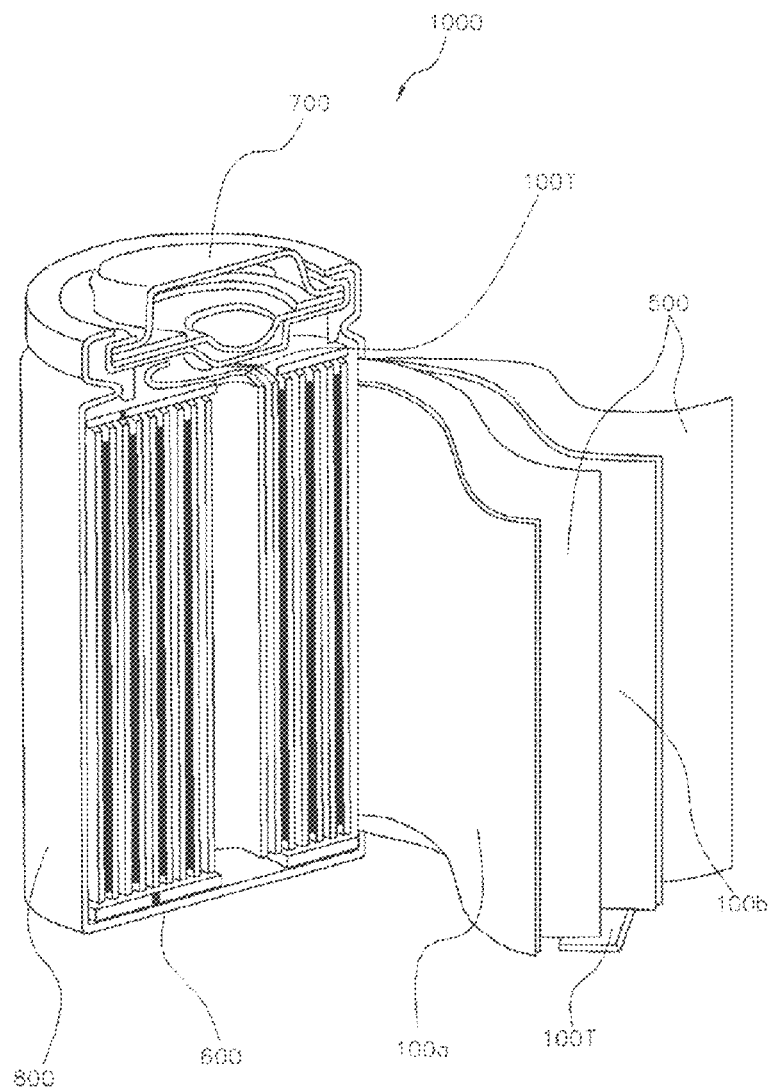
FIG. 5A is an exploded perspective view illustrating a battery using electrode structures, according to an embodiment of the present invention.
Figure 5B:
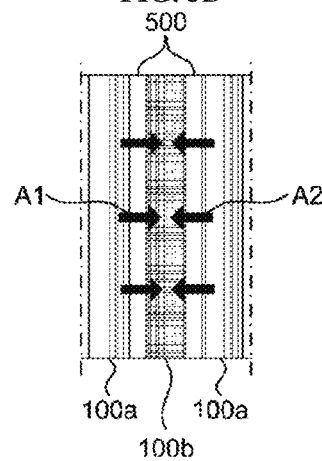
FIG. 5B is a cross-sectional view for explaining a method of stacking the electrode structures, according to an embodiment of the present invention.

FIG. 5A is an exploded perspective view illustrating a battery 1000 using electrode structures 100a and 100b, according to an embodiment of the present invention. FIG. 5B is a cross-sectional view for explaining a method of stacking the electrode structures 100a and 100b, according to an embodiment of the present invention.

Referring to FIG. 5A, the battery 1000 may be a general cylindrical battery. In order to increase a reaction area, the electrode structures 100a and 100b having different polarities which act for a cathode and an anode may be alternately wound around each other. Conductive taps 100T such as the conductive layers CL of FIGS. 4A and 4B may be respectively coupled to end portions of the electrode structures 100a and 100b.

Referring to FIGS. 5A and 5B, in order to insulate the electrode structures 100a and 100b having different polarities, a separator 500 may be disposed between the electrode structures 100a and 100b. When a current collector such as a conventional metal foil is not coated on at least one or all of the electrode structures 100a and 100b having different polarities, ion exchange may occur in both directions between the electrode structures 100a and 100b during charging/discharging. For example, in a lithium-ion battery, when the first electrode structure 100a is for a cathode and the second electrode structure 100b is for an anode and a conventional current collector is not applied to the electrode structure 100b for an anode, the electrode structure 100b may be shared between one pair of adjacent electrode structures 100a. Accordingly, while the battery 1000 is discharged, lithium ions of the electrode structure 100a move to both surfaces of the electrode structure 100b in directions marked by arrows A1 and A2 to emit energy. Even when the battery 1000 is charged, lithium ions move in both directions, thereby contributing to chemical reaction of the battery 1000.

An electrical capacity decreases as a thickness of an electrically active material layer in a conventional electrode structure including a metal foil-type current collector and electrically active materials that are coated on the metal foil-type current collector increases. However, in FIG. 5B, even when a thickness of an anode current collector is great, for example, when a thickness of the anode current collector is two times greater than a thickness of the electrically active material layer of the conventional electrode structure, the battery 1000 may have an equal or greater electrical capacity. Also, since the number of separators 500 used is less than that used when the conventional electrode is used, the battery 1000 having higher energy density may be provided.

The separator 500 may be, for example, a polymer-based microporous film, a woven fabric, a non-woven fabric, ceramic, an intrinsic solid polymer electrolyte film, a gel solid polymer electrolyte film, or a combination thereof. The intrinsic solid polymer electrolyte film may include, for example, a straight chain polymer material or a crosslinked polymer material. The gel polymer electrolyte film may be any one of a plasticizer-containing polymer, a filler-containing polymer, or a pure polymer including salt or a combination thereof. The solid electrolyte layer may include, for example, a polymer matrix composed of any one of polyethylene, polypropylene, polyimide, polysulfone, polyurethane, polyvinyl chloride, polystyrene, polyethylene oxide, polypropylene oxide, polybutadiene, cellulose, carboxymethyl cellulose, nylon, polyacrylonitrile, polyvinylidene fluoride, polytetrafluoroethylene, a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybutylacrylate, polybutylmethacrylate, polyvinyl acetate, polyvinyl alcohol, and a combination thereof, an additive, and an electrolytic solution. The materials of the separator 500 are exemplary, and any material that has an easily changeable shape, has a high mechanical strength, may not be broken or cracked even when the electrode structures 100a and 100b are deformed, has an arbitrary appropriate electron insulation, and excellent ion conductivity may be used.

The separator 500 may be a single or multi-layered film, and the multi-layered film may be a stack of single-layered films formed of the same material or a stack of single-layered films formed of different materials. For example, the stack may have a structure including a ceramic coating film on a surface of a polymer electrolyte film such as polyurefin. Considering durability, shut-down function, and stability of the battery 1000, a thickness of the separator 500 may range from 10 µm to 300 µm, preferably, from 10 µm to 40 µm, and more preferably, from 10 µm to 25 µm.

The battery 1000 is electrically connected to external electrode terminals 600 and 700 through the conductive taps 100T coupled to the electrode structures 100a and 100b. An aqueous electrolytic solution including salt such as potassium hydroxide (KOH), potassium bromide (KBr), potassium chloride (KCL), zinc chloride (ZnCl2), or sulfuric acid (H2SO4) in a housing 900 may be infiltrated into the electrode structures 100a and 100b and/or the separator 500, thereby completing the battery 1000. Although not shown in FIGS. 5A and 5B, an appropriate battery management system for controlling stability and/or power supply characteristics while the battery 1000 is used may be additionally coupled.

Since shapes of the electrode structures 100a and 100b including the metal fibers 10 are easily changed due to their characteristics as a fiber and an active material layer and a conductive network are substantially uniformly mixed in each of the overall electrode structures 100a and 100b, even when a thickness is increased in order to adjust a capacity of the battery 1000, performance of the battery 1000 may not be deteriorated unlike in the conventional electrode structure obtained by coating an active material layer on a metal foil, and thus any of various volumes may determine for the battery 1000

Also, since shapes of the electrode structures 100a and 100b including the metal fibers 100 may be easily changed, the electrode structures 100a and 100b may be three-dimensionally deformed, for example, being stacked, bent, and wrapped as well as being wound as shown in FIG. 5A, and the battery 1000 having any of various volumes and shapes, instead of a cylindrical shape, may be integrated with a an angular or pouch-like fibrous product such as clothes or bags Also, the electrode structures 100a and 100b may be applied to any one or all of a cathode and an anode of one battery.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the embodiments, since metal fibers that have excellent electrical, mechanical, and thermal characteristics which a metal has and flexibility and a structure which a fiber has, contact resistance between a current collector and electrically active materials may be reduced and a contact area may be increased, thereby improving energy density, charge/discharge speed, charge/discharge efficiency, and cycle characteristics of a battery.

Also, since a current collector using fibers having a nonwoven structure instead of a current collector using an existing foil is used, the number of separators used to manufacture a battery by stacking electrodes may be reduced. As a result, since an electrode may be manufactured to have a great thickness in the same volume, the battery may have excellent energy density per unit volume.

The invention claimed is:

1. A battery including an electrode, the battery comprising:
   a conductive network that is formed by using one or more metal fibers;
   a pre-coated layer on surfaces of some or all of the surfaces of some or all of the one or more metal fibers; and
   a particle composition comprising a first electrically active material that is provided as particles which are bound to the conductive network and a plurality of binder particles by using a dry mixing process so as to form the particle composition as non-solvent dry powder,
   wherein the binder particles are provided as point binders between the one or more metal fibers and the first electrically active material particles, and between the first electrically active material particles by applying heat energy or ultraviolet rays,
   wherein the pre-coated layer comprises a second electrically active material provided as particles and having chemical affinity for forming a chemical compound with the first electrically active material, and the second electrically active material is different from the first electrically active material, and
   wherein the one or more metal fibers are randomly arranged to be tangled to each other to form pores in the conductive network and the first electrically active material particles are impregnated into the pores, and the first electrically active material particles bound to the conductive network are electrically contracted with the conductive network via the second electrically active material particles.

2. The battery of claim 1, wherein the one or more metal fibers are bonded to one another by randomly only physically contacting one another, and the conductive network has a nonwoven structure.

3. The battery of claim 1, wherein the particle composition further comprises any one or all of a conductor, and porous ceramic particles.

4. The battery of claim 1, wherein each of the one or more metal fibers has a thickness ranging from 1 μm to 200 μm.

5. The battery of claim 1, wherein each of the one or more metal fibers has a thickness ranging from 2 μm to 20 μm.

6. The battery of claim 1, wherein the one or more metal fibers comprise any one of stainless steel, aluminum, nickel, titanium, copper, an alloy thereof, or a combination thereof.

7. The battery of claim 1, wherein a ratio of an average size of the first and second electrically active material particles to an average thickness of the one or more metal fibers ranges from 0.01 to 10.

8. A battery including an electrode, the battery comprising:
- a conductive network that is formed by using one or more metal fibers; the conductive network has a nonwoven structure;
- a pre-coated layer on surfaces of some or all of the surfaces of some or all of the one or more metal fibers; and
- a particle composition comprising a first electrically active material that is provided as particles which are bound to the conductive network and a plurality of binder particles by using a dry mixing process so as to form the particle composition as non-solvent dry powder, wherein the binder particles are provided as point binders between the one or more metal fibers and the first electrically active material particles, and between the first electrically active material particles by applying heat energy or ultraviolet rays, wherein the pre-coated layer comprises a second electrically active material provided as particles and having chemical affinity for forming a chemical compound with the first electrically active material, and the second electrically active material is different from the first electrically active material, and wherein the one or more metal fibers are randomly arranged to be tangled to each other to form pores in the conductive network and the first electrically active material particles are impregnated into the pores, and the first electrically active material particles bound to the conductive network are electrically contracted with the conductive network via the second electrically active material particles.

9. The battery of claim 8, wherein the particle composition further comprises any one or all of a conductor, and porous ceramic particles.

10. The battery of claim 8, wherein each of the one or more metal fibers has a thickness ranging from 1 μm to 200 μm.

11. The battery of claim 8, wherein each of the one or more metal fibers has a thickness ranging from 2 μm to 20 μm.

12. The battery of claim 8, wherein the one or more metal fibers comprise any one of stainless steel, aluminum, nickel, titanium, copper, an alloy thereof, or a combination thereof.

13. The battery of claim 8, wherein a ratio of an average size of the first electrically active material particles to an average thickness of the one or more metal fibers ranges from 0.01 to 10.

14. The battery of claim 1, wherein the first electrically active material and the second electrically active material comprise an electrically active material for a cathode, and the electrically active material for a cathode is selected from the group consisting of oxide, phosphate, sulfide, and fluoride, each of which includes two or more components selected from lithium, nickel, cobalt, chromium, magnesium, strontium, vanadium, lanthanum, cerium, iron, cadmium, lead, and/or manganese, and a combination thereof.

15. The battery of claim 1, wherein the point binders make point contacts with the one or more metal fibers or the first electrically active material particles, and wherein the first electrically active material is bound to some of all of the one or more metal fibers by forming a sintered body through thermal treatment between the first electrically active material and the second electrically active material having chemical affinity with the first electrically active material.

16. The battery of claim 8, wherein the point binders make point contacts with the one or more metal fibers or the first electrically active material particles, and wherein the first electrically active material is bound to some of all of the one or more metal fibers by forming a sintered body through thermal treatment between the first electrically active material and the second electrically active material having chemical affinity with the first electrically active material.

* * * * *